US007305067B1

(12) United States Patent
Diggle, III

(10) Patent No.: US 7,305,067 B1
(45) Date of Patent: Dec. 4, 2007

(54) TONE DISTRIBUTION APPARATUSES, SYSTEMS, AND METHODS

(75) Inventor: Frederick James Diggle, III, Birmingham, AL (US)

(73) Assignee: AT&T BLS Intellectual Property, Inc, Wilmington, DE (US)

( * ) Notice: Subject to any disclaimer, the term of this patent is extended or adjusted under 35 U.S.C. 154(b) by 619 days.

(21) Appl. No.: 10/666,057

(22) Filed: Sep. 18, 2003

(51) Int. Cl.
  *H04M 1/24* (2006.01)
  *H04M 3/08* (2006.01)
  *H04M 3/22* (2006.01)

(52) U.S. Cl. .................. 379/27.03; 379/21; 379/22.02; 379/25; 324/66

(58) Field of Classification Search ............... 379/1.01, 379/8–9, 9.06, 14.01, 21, 22.03, 22.07, 23, 379/25, 27.01, 31, 32.04–32.05
See application file for complete search history.

(56) References Cited

U.S. PATENT DOCUMENTS

| 4,536,703 | A | * | 8/1985 | Jablway et al. ............. 324/540 |
| 4,772,845 | A | * | 9/1988 | Scott ............................ 324/66 |
| 4,879,739 | A | * | 11/1989 | Forson ......................... 379/21 |
| 5,166,970 | A | * | 11/1992 | Ward ........................... 379/21 |
| 5,307,398 | A | | 4/1994 | Contonzo et al. |
| 6,512,378 | B2 | * | 1/2003 | Fernandez .................. 324/539 |
| 2003/0132757 | A1 | * | 7/2003 | Fernandez .................. 324/539 |

* cited by examiner

*Primary Examiner*—Binh K. Tieu
(74) *Attorney, Agent, or Firm*—Lee & Hayes, PLLC

(57) ABSTRACT

An apparatus and system for connecting a tone generator to a plurality of conductors communication line. The apparatus includes an interconnect structure that includes multiple leads each including an electrically conductive portion having a first end and a second end. The multiple leads are commonly electrically attached at the first end and are configured to electrically attach to a tone generator. The multiple leads also include a plurality of electrical connection devices electrically attached to a plurality of corresponding leads at the second end. A plurality of first electrical connection devices are configured to engage a plurality of electrical conductors of a communication line to provide an electrical connection between the tone generator and a plurality of electrical conductors of the communication line. The system includes a tone generator coupled to the interconnect structure.

20 Claims, 4 Drawing Sheets

TONE DISTRIBUTION APPARATUSES, SYSTEMS, AND METHODS

BACKGROUND

The present invention relates generally and in various embodiments to communications apparatuses, systems, and methods. More specifically, the present invention relates generally and in various embodiments to instruments for testing telecommunications lines.

Although various implementations of the present invention, among many, may be described herein with reference to the specific illustrative embodiments related to particular applications, those skilled in the art will understand that the invention is not in any way intended to be, nor should be, limited to such embodiments and/or applications. Those having ordinary skill in the art and reference to the description of the embodiments disclosed and described herein will recognize that additional modifications, applications, and other embodiments may fall within the scope of the claimed invention, and that there may be additional fields in which the present invention may be practiced.

Conventional communication test equipment may be used to test telephone, data, HVAC systems, and security or fire alarm systems using a tone generator. The tone generator is connected across one end of a pair of communications wires and emits a continuous or an alternating tone into the wires. A probe is used at the other end of the wires to identify the wires carrying the tone signal. Thus, a communication cable containing a plurality of wires may be tested for broken wire pairs, continuity, short circuits, open circuits, crosses, and imbalances in the wires. The tone generator also may provide battery power for communicating across a vacant, e.g., unused, pair of wires.

Telephone company technicians use tone generators to test new or existing telephone line copper wire pairs running from a telephone interconnection site (cross-box) to a junction box (serving terminal) located high on a telephone pole or on the ground near an end user residence or facility. The telephone line is usually tested because of the uncertainty of whether the copper wire pairs that are assigned by the telephone company are actually available for services. Oftentimes, the wires assigned to provide the telephone service are either open or may be dedicated to another line with no record of it back at the telephone company. When a candidate copper wire pair is not available for service as prescribed by the telephone company, the technician obtains a new list of candidate copper wire pairs from the records department at the telephone company and proceeds to identify which of the candidate copper wire pairs are suitable for provisioning the telephone service.

In order to test a telephone line, the technician uses a list of candidate copper wire pairs and, between the cross-box and the serving terminal, located between the central office and the end user verifies continuity of the new wire pairs (e.g., testing for short circuits and/or open circuits in one or both of the copper wire pair), identifies wiring faults, determines line polarity, and the like, until a continuous pair of copper wires is found that have no shorts, grounds, opens, crosses or imbalances.

Once the obviously bad candidate copper wire pairs have been identified, the technician begins a final test phase that includes applying a test tone signal to one end of a candidate copper wire pair in the cross-box. In the case where the serving terminal is located on a telephone pole, the technician then climbs up the telephone pole to the serving terminal to monitor the copper wire pairs using a probe or a handset to identify which copper wire pair is carrying the tone signal applied to the wire pair at the cross-box. If the technician cannot identify the wire pairs at the serving terminal, he must climb down the telephone pole go back to the cross-box and connect the tone generator to another candidate copper wire pair and return to the serving terminal and again trace which wire pair is carrying the tone signal. This process is repeated with due diligence until the technician identifies a good pair of copper wires for provisioning the telephone service to the end user.

SUMMARY

In one general respect, embodiments of the present invention are directed to an apparatus for connecting a tone generator to a plurality of conductors communication line. The apparatus includes an interconnect structure that further includes a first plurality of leads. The leads include an electrically conductive portion having a first end and a second end. The first plurality of leads are commonly electrically attached at the first end. The first end is configured to electrically attach to a tone generator. The apparatus also includes a plurality of first electrical connection devices electrically attached to a plurality of corresponding leads of the first plurality of leads at the second end. A plurality of first electrical connection devices are configured to engage a plurality of electrical conductors of a communication line to provide an electrical connection between the tone generator and a plurality of electrical conductors of the communication line.

According to various embodiments, the present invention is directed to a system for testing a communication line including a plurality of electrical conductors, the system. The system includes a tone generator having a signal output terminal and a common return terminal. The system further includes an interconnect structure electrically coupled to the tone generator that includes a first plurality of leads. The leads include an electrically conductive portion having a first end and a second end. The first plurality of leads are commonly electrically attached at the first end. The first end is configured to electrically attach to the signal output terminal of the tone generator. The interconnect structure also includes a plurality of first electrical connection devices electrically attached to a plurality of corresponding leads of the first plurality of leads at the second end. A plurality of first electrical connection devices configured to engage a plurality of electrical conductors of a communication line to provide an electrical connection between the tone generator and a plurality of electrical conductors of the communication line. The tone generator emits a single output tone signal that is simultaneously distributed to a plurality of electrical conductors of the communication line.

Other apparatuses, systems, and/or methods according to embodiments of the present invention will be or become apparent to one with skill in the art upon examination of the following drawings and detailed description. It is intended that all such additional apparatuses, systems, and/or methods be included within this description, be within the scope of the present invention, and be protected by the accompanying claims.

DESCRIPTION OF THE DRAWINGS

Embodiments of the present invention are described herein in conjunction with the following figures, wherein.

DESCRIPTION

It is to be understood that the figures and descriptions of the various embodiments of present invention described herein, among others, have been simplified to illustrate representative elements of a device for testing communication equipment that are relevant for a clear understanding of the present invention, while eliminating, for purposes of clarity, other specific elements of the communications device. For example, specific circuitry for implementing a tone generator is not described herein as that would not facilitate a better understanding of the present invention. Those of ordinary skill in the art will appreciate, however, that these and other elements may be found in conventional communications test instruments and may be readily understood.

Figure 1:
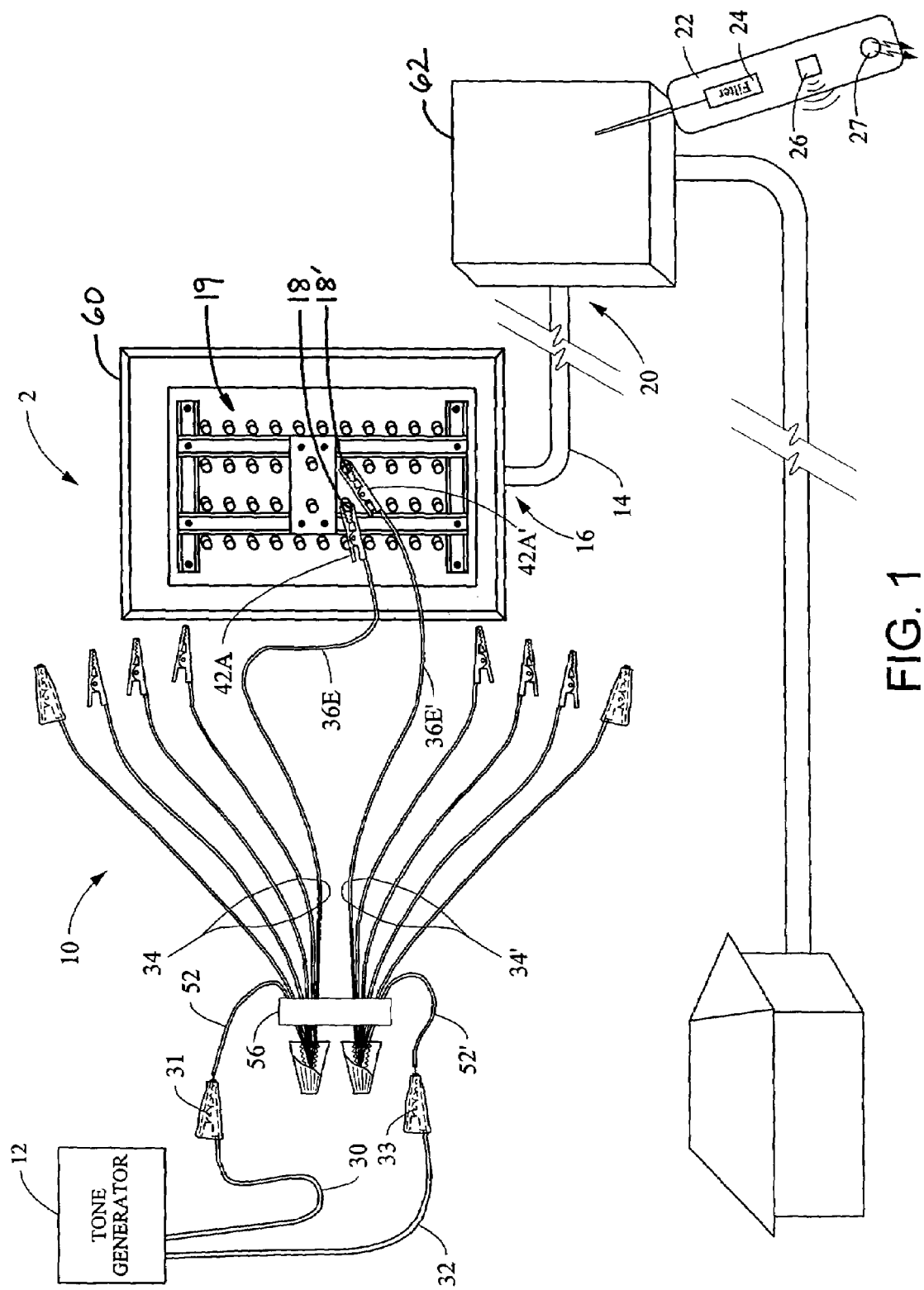
FIG. 1 illustrates various embodiments of a system comprising a communications test interconnect structure according to various embodiments of the present invention.

The various embodiments of the present invention described herein, among others, are generally directed to a device for testing communication equipment that may be used to perform a variety of functions as described herein. FIG. 1 illustrates a system 2 comprising a communications test interconnect structure 10 in accordance with various embodiments of the present invention, a tone generator 12, and a probe 22. To simplify the description of the various embodiments of the present invention, the communication test interconnect structure 10 is referred to herein as a tone distribution tree 10.

In various embodiments of the present invention the tone distribution tree 10 comprises a first bundle or set of electrically conductive leads 34 and in other embodiments may comprise a second bundle or second set of electrically conductive leads 34'. The tone distribution tree 10 may be used for simultaneously distributing one or more tone signals emitted by the tone generator 12 to a communication line 14 under test comprised of a plurality of conductors. The tone signals emitted by the tone generator 12 may be distributed to the plurality of conductors into a first end 16 of the communication line 14 via the tone distribution tree 10. The plurality of conductors is comprised of two or more wire pairs, which terminate at a plurality of terminals 19 such as terminals 18, 18' located in a cross-box 60, for example. If the wire pair connected to the tone signals at the first end 16 is are in suitable condition, the tone signals may be detected at a second end 20 of the communication line 14 where it connects to a serving terminal 62 with the probe 22.

The tone generator 12 is one of many embodiments of a tone generator that may be used in conjunction with one of many embodiments of the present invention for testing the communications line 14 stretching from one physical location to another over distances ranging from a few feet to several miles. The tone generator 12 is a communication line 14 installation and troubleshooting tool and may be used to test the wire pairs terminated in the serving terminal 62 for continuity, short circuits, open circuits, crosses, and imbalances, for example. The tone generator 12 emits either a single tone signal or multiple tone signals through first and second leads 30, 32, respectively. The first signal lead 30 is connected to a signal output terminal of the tone generator 12 and may be used to carry the tone signal(s). The second lead 32 is connected to a common return terminal of the tone generator 12 and may be used to provide a common return path for the tone signal(s). The tone generator 12 may be used to test the communications line 14 comprising a plurality of copper wire pairs running from the cross-box 60 to the serving terminal 62. At the cross-box 62 located at the first end 16 of the communication line 14, the tone tree 12 may be connected across one or more copper wire pairs terminated at terminals 18, 18', for example, to inject a continuous or alternating tone signal into one or more wire pairs. The tone signal(s) injected into the one or more wire pairs at the first end 16 of the communication line 14 subsequently may be traced at the second end 20 of the communication line 14 where the wire pairs are terminated inside the serving terminal 62 using the probe 22. Those skilled in the art will appreciate, however, that the tone signals may be injected at either end 16, 20 of the communication line 14 without departing from the scope of the invention.

The communication line 14 under test may comprise, for example, a plurality of wire pairs for conducting communications signals such as voice and data signals. In one of many embodiments of the present invention, the wire pairs may comprise solid or stranded conductors. In one of many embodiments of the present invention the solid or stranded conductors may be formed of, for example, copper, aluminum, gold, silver or any other metallic conductor suitable for carrying electric communication signals. One of the conductors comprising the wire pair may be terminated at terminal 18, for example, and may be used to carry the communication signal while the other conductor, for example, may be terminated at terminal 18', and may be used to provide a return path for the signal. The communication line 14 under test may be any communication line comprising a plurality of conductors suitable for transmitting electrical signals such as voice and data telephone signals, heating ventilation and air conditioning (HVAC) signals, security and alarm signals (e.g., fire and burglar alarm systems), smart house control signals, internal building signals for doorbell and intercom systems, and a variety of other communication links in which wires are used to conduct the electrical signals from a first point to a second point. In various embodiments of the present invention the system also may comprise a tone detector 22 at the second end 20 of the communications line 14 for detecting the transmitted tone signals emitted by the tone generator 12.

At the second end 20 of the communication line 14 where the wire pairs terminate in the serving terminal 62, the wire pairs may be traced with a specially designed probe 22 to identify which pair of the plurality of conductor pairs is carrying the tone signals emitted by the tone generator 12. The probe 22 detects and amplifies tone signals generated by the tone generator 12. The probe 22 also may include a filter 24 that provides a filtering function to remove unwanted signals such as, for example, power influenced noise signals that may be present in the plurality of conductors 18. The probe also may include some form of audio 26 or visual 27 feedback device that indicates when the probe 22 has detected the wire pair carrying the tone signal. Those skilled in the art will appreciate that the probe 22 may be located some physical distance away from the first end 16 of the communication line 14 ranging from a few feet to a few miles. Using the tone generator 22, for example, a telecommunication service technician may trace and identify which copper wire pair at the second end 20 of the communication line 14 is carrying the tone signal, may identify broken wires, and also may test for continuity, short circuits, open circuits, crosses, and imbalances in the wires or cables. The tone generator 12 also may provide battery power for communicating across a vacant, e.g., unused, pair of wires, if necessary.

In use, the tone signal lead 30 of the tone generator 12 is connected to a first pigtail lead 52 of the tone distribution tree 10 through a first electrical clip 31 or other electrical connection device. The common lead 32 of the tone generator 12 is connected to a second pigtail lead 52' through a second electrical clip 33. Thus the tone signal(s) and common return(s) of the tone generator 12 are distributed to the first and second set of electrically conductive leads 34, 34', respectively. Accordingly, each of the leads forming the first and second set of electrically conductive leads 34, 34' may be used to simultaneously distribute the tone signal(s) to a plurality of conductors forming the telecommunication line 14 under test that are connected to the plurality of terminals 19 inside the cross-box 60. The tone carrying lead 30 may be applied to the signal carrying conductor at terminal 18, for example, through electrical clip 42A electrically connected to lead 36E. Similarly, the signal common conductor at terminal 18' may be connected to the signal common lead 32 of the tone generator 12 through electrical clip 42A', which is electrically connected to lead 36E'. If there are no shorts, grounds, opens, crosses or imbalances in the wire pair 28 being tested, for example, the tone signal carrying wire pair may be traced at the second end 20 of the communication line 14 the in serving terminal 62 using the probe 22 or other similar cable tracing device operable with a conventional tone generator.

Utilization of the tone distribution tree 10 may increase, for example, the probability of finding the tone signal injected into the copper wire pairs at the first end 16 of the telecommunication line 14, or at the second end 20 of the telecommunication line 14. Therefore, the tone distribution tree 10 may increase the likelihood that a continuous pair of copper wires may be identified among the plurality of copper wires comprising the telecommunication line 14. This may be useful when provisioning new telephone service, for example. The tone distribution tree 10 may be utilized, for example, in conjunction with a conventional tone generator or may be utilized with a tone generator having a higher output power than conventional tone generators. The higher output power tone generator may be useful, for example, for supplying additional tone carrying electrical current among a plurality of copper wire pairs rather than supplying the current to a single copper wire pair as is conventionally done.

Figure 2:
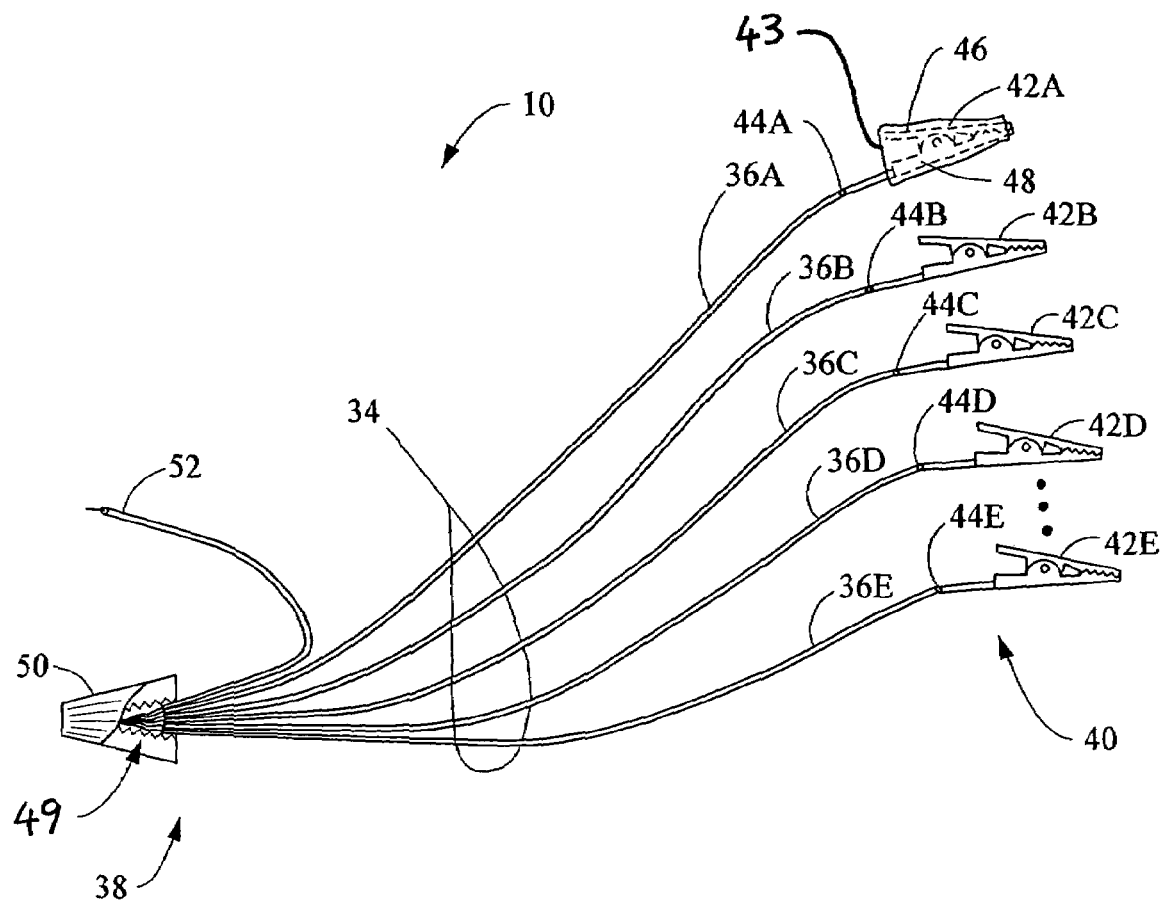
FIG. 2 illustrates various embodiments of a communications test interconnect structure.

With reference now to FIG. 2, in various embodiments of the present invention, the tone distribution tree 10 includes the first bundle or set of leads 34 comprised of electrically conductive leads 36A, B, C, D, E having a first end 38 and a second end 40. The leads 34A-E may be formed of a metallic material suitable for carrying electric current and are swathed by an electrical insulating sheathe. The metallic conductor portion of the leads 36A-E comprises any metallic electrical conductor suitable for carrying an electric current including, but not limited to, copper, aluminum, silver, gold, carbon, steel, brass, nichrome, and the like. The metallic conductor portion of the leads 34A-E may be comprised of, for example, a single solid metallic conductor or may be comprised of two or more strands of metallic conductors without departing from the scope of the present invention. The electrical insulating sheathe comprises any electrical insulator, including for example, poly-vinyl-chloride (PVC). In various embodiments of the present invention, each of the leads 36A-E forming a portion of the tone distribution tree 10 is comprised of a single solid copper conductor swathed in a PVC sheathe.

At the second end 40 of the tone distribution tree 10, the leads 36A-E may include an exposed conductive end suitable for electrically connecting the leads 36A-E to another electrical conductor. Alternatively, the second end 40 of the leads 36A-E may be terminated with one or more electrical clips 42A, B, C, D, E that electrically attach to the leads 34A-E at electrical junctions 44A, B, C, D, E. The electrical attachment of the clips 42A-E to the leads 34A-E at the junctions 42A-E may be made by, for example, crimping, screwing, soldering, or any suitable means for electrically attaching and detaching the leads 36A-E to the clips 42A-E. The clips 42A-E may be any type of connector suitable for making a temporary electrical connection between two or more electrical conductors such as, for example, any of the set of leads 34 and the twisted wire pairs 28. The clips 42A-E may be spring-loaded clips each having an upper jaw 46 and lower jaw 48 for grasping bare electrical conductors. The clips 42A-E may include, for example, one or more electrical contacts, which may or may not be located on each of its upper and lower jaws 46, 48. The clips 42A-E may be electrically connected so that they have the same polarity as one of the poles (e.g., signal or common) of the tone generator 12 to which the clips 42A-E are connected. In various embodiments of the present invention, for example, the clips 42A-E may include an electrically conductive grabber or pincer for releasably engaging and retaining bare electrically conductive leads therebetween. Also, the clips 42A-E may be, but are not necessarily limited to, spring loaded unipolar type electrical clips characterized by smooth contacts or serrated teeth contacts having a uniformly tapered shape, commonly referred to as alligator clips. The clips 42A-E may or may not include an insulated boot over them 43.

At the first end 38 of the tone distribution tree 10, the leads 36A-E may be electrically coupled to each other at a common junction 49. The leads 36A-E may be permanently or releasably electrically attached or joined to each other at the common junction 49 by any of a variety of electrical coupling means such as a solder joint, a wire nut 50, a crimp connector, and other similar types of electrical coupling means, for example.

Furthermore, the leads 36A-E at the first end 38 of the tone distribution tree 10 also may be permanently or releasably attached to a short length of electrical conductor. This short length of conductor is referred to herein as a pigtail conductor 52 and is used for connecting the tone distribution tree 10 to the tone generator 12. The pigtail conductor 52 may be attached at the common junction 49 to the coupled conductors using similar electrical coupling or attachment means as used for electrically coupling the leads 36A-E at the first end 38 of the tone distribution tree 10. In addition, the pigtail conductor 52 may be removeably attached to the common junction 49 by a removable connector, and the like. Moreover, the pigtail conductor 52 itself may comprise an electrical clip similar to the clips 42A-E for removeably connecting the pigtail conductor 52 to the tone generator 12 or another electrical conductor.

In operation, the pigtail conductor 52 may be connected to one of the electrical clips 31, 33 of the tone generator 12 and may receive the tone signal(s) therefrom, for example. The tone signal(s) then may be distributed to the plurality of leads 36A-E forming the first set of leads 34. From the plurality of leads 36A-E, the tone signal(s) may be simultaneously distributed to the one or more conductive wire pairs forming the telecommunication line 14 under test. In one of many embodiments of the present invention, the tone distribution tree 10 may be connected to any of the conductive wire pairs terminated at the cross-box 60 by attaching the leads 36A-E to the one or more terminals 19 using the clips 42A-E.

Figure 3:
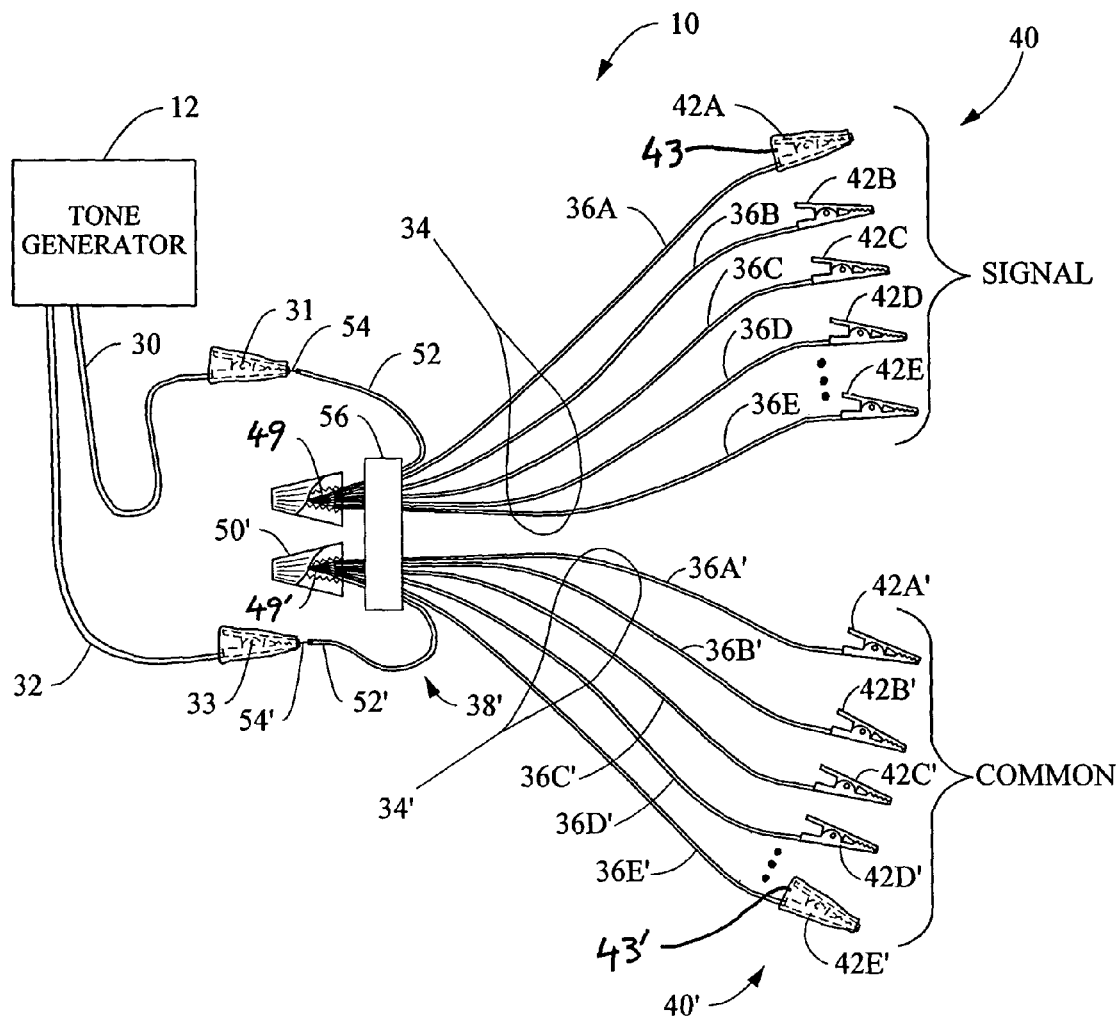
FIG. 3 illustrates various embodiments of a communications test interconnect structure.

Turning to FIG. 3, the tone distribution tree 10 according to various embodiments of the present invention also may include the second bundle or set of leads 34'. Like the first set of leads 34, each lead 36A', B', C', D', E' forming the second set of leads 34' may include an exposed conductive end or may be terminated with one or more clips 42A', B', C', D', E' or other removeably attachable and detachable electrical connection means. The individual leads 36A'-B' comprising the second set of leads 34' also may be electrically connected at a first end 38' using any conventional means of electrically connecting two or more leads 36A'-E'. As discussed previously, the leads 36A'-E' may be, for example, soldered, crimped, twisted in a wire nut 50', and any other similar means of permanently or releasably attaching two or more electrical conductors. Furthermore, the second end 38' of the second set of leads 34' also is connected to a second pigtail conductor 52'. The first and second set of leads 34, 34' also may be bundled together using, for example, heat shrink tubing 56. The clips 42A'-E' may or may not include an insulated boot over them 43'.

Thus, in the various embodiments of the present invention, the tone distribution tree 10 may comprise one or two individual bundles or sets of leads 34, 34' wherein each set has a second end 40, 40' attached to the individual leads 36A'-E' terminated with one or more clips 42A-E, 42A'-E' and has a first end 38, 38' where the individual leads 36A-E, 36A'-E' are electrically attached at a common junction 49, 49' by any of the electrical attachment means discussed previously. In various embodiments of the present invention, the tone distribution tree 10 may include first and second pigtails 52, 52' each separately connected to the first end 38, 38' of each set of leads 34, 34' forming the tone distribution tree 10. Each pigtail 52, 52' may include a bare conductive end 54, 54' for receiving the test clips 31, 33, respectively, of the tone generator 12.

Figure 4:
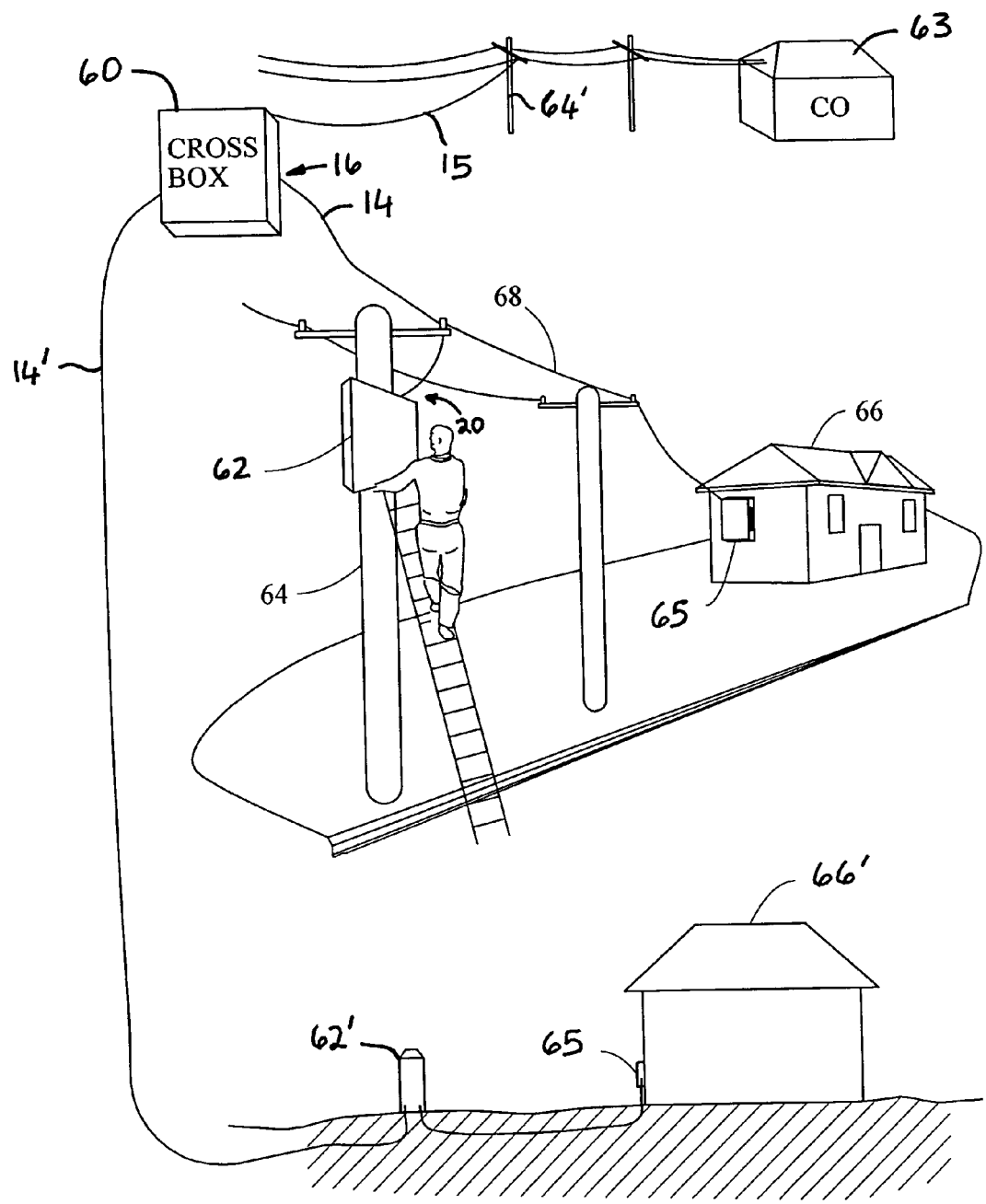
FIG. 4 is a schematic diagram of a section of a telecommunication line that may be tested using various embodiments of the present invention.

FIG. 4 illustrates sections of telecommunication lines 14, 14' that may be tested using various embodiments of the present invention. The telecommunication lines 14, 14' to be tested may extend, for example, between the cross-box 60 and the serving terminals 62, 62'. The cross-box 60 generally is located between the telephone company's central office 63 and the serving terminals 62, 62' servicing the end user residences 66, 66', respectively. The serving terminals 62, 62' may be telephone pole 64 mounted, e.g., the serving terminal 62, or may be ground based, e.g., the serving terminal 62'. In either case the serving terminals 62, 62' are both connected to the main telecommunications line 15 from the central office 63 through the cross-box 60. The end user sites 66, 66' may be, for example, commercial or residential buildings that subscribe to telecommunications services provided through the telecommunication lines 14, 14', respectively. The site 66, 66' may be, for example, new construction sites that are being provisioned with new telecommunication services for the first time. The serving terminals 62, 62' act as the interfaces between the telecommunication company's owned telephone lines 14, 14', for example, and the customer owned equipment at the site such as telephones, fax machines, computers, modems, and other similar customer premises equipment. The telecommunication company may provide the telephone interfaces 65 that provide the telephone feeds to the individual sites 66, 66'.

In one example, to test the telecommunication line 14, a telecommunication service technician couples the tone distribution tree 10 and the tone generator 12 to the first end 16 of the telecommunication 14 at the cross-box 60 in a manner described previously with reference to FIGS. 1-3. The tone distribution tree 10 is temporarily connected to the first end 16 of the telecommunication line 14 through the individual leads 36A-E and 36A'-E' temporarily electrically connected to the plurality of terminals 19 located inside the cross-box 60. The technician then climbs up the telephone pole 64 to reach the serving terminal 62 and proceeds to trace the wire pairs at the second end 20 of the telecommunication line 14 connected to the serving terminal 62 to identify which copper wire pairs in the serving terminal 62 are suitable for communications purposes to provision the end user at the site 66. If there are one or more sets of copper wire pairs that are faulty and unsuitable for communications purposes, the technician can simply try another copper wire pair in the serving terminal 62 without having to physically climb down the pole 64 and return to the cross-box 60 and switch the tone generator 12 leads to another candidate wire pair. Because the tone distribution tree 10 simultaneously distributes the tone signal(s) to a plurality of wire pairs at the cross-box 60, the technician can trace multiple copper wire pairs at the serving terminal 62 without having to travel to and from the cross-box 60 and the serving terminal 62 high on the telephone pole 64 if some of the copper wire pairs are not suitable for communication purposes.

Those skilled in the art will appreciate that a similar procedure may be used to test the telecommunication line 14' extending from the cross-box 60 to the ground based serving terminal 62'. In this example, although the technician does not have to climb up and down the pole 64 to conduct a series of tests with the tone generator 12 and the tone distribution tree 10, he may have to travel up to several miles between the cross-box 60 and the serving terminal 62'.

Various embodiments of the tone distribution tree 10 according to the present invention also may be used to other sections of a telecommunications line. For example, the tone distribution tree 10 may be used to test a section of telecommunication line generally known as a block cable 15. This is a section of copper conductors extending from a main cable feeder to the cross-box 60. The main cable feeder may be located on another telephone pole 64', for example. The block cable 15 may be tested in a similar manner discussed previously with respect to telecommunication lines 14, 14' and also may save the technician time and effort.

Various embodiments of the present invention also provide a tone generator 12 having greater power output so as to increase the total energy injected into a candidate copper pair. A high power tone generator 12 in conjunction with the tone distribution tree 10 allows the technician to inject a single tone signal(s) or a multiple tone signal(s) into additional candidate copper wire pairs than a conventional tone generator.

The operation of various embodiments of the present may be better understood by way of the following illustrative example. A telephone company technician, for example, may use a tone generator 12 and tone distribution tree 10 to test new or existing telephone lines 14, 14'. One example circumstance in which the need to test a telephone lines 14 arises is when a technician is dispatched to connect new telephone service to a site 66. The telephone line 14 extends from the cross-box 60 to the serving terminal 62 located high on the telephone pole 64, for example. The communication line 14 may need to be tested because often the copper wire pairs assigned to a new telephone service order are either open circuit or may have been dedicated to another line without the telephone company records being updated. In these situations, the technician obtains a new list of candidate copper wire pairs from the records department at the telephone company.

In testing the telephone line 14, the technician uses the list of candidate copper wire pairs and at the cross-box 60 attaches the tone generator 12 to the plurality of copper wire pairs comprising the communication line 14 through the tone distribution tree 10. Testing at the cross-box 60 may begin by verifying continuity of the new candidate copper wire pairs (e.g., testing for short circuits and/or open circuits in one or both of the copper pair), identifying wiring faults, determining line polarity, and other tests on each available copper pair in the telephone line 14 until a continuous pair is found having no other problems such as shorts, grounds, opens, crosses or imbalances. Using a volt-ohm meter, the technician may reject some of the candidate copper wire pairs immediately. Once the obviously bad copper wire pairs have been eliminated the technician connects the tone distribution tree 10 and the tone generator 12 to the candidate copper wire pairs and applies the tone signal(s) thereto.

Once the tone distribution tree 10 is connected at the cross-box, the technician goes to the location of the serving terminal 62, climbs up the pole 64, and begins testing using the probe 22 or a handset. With the probe 22 or a handset the technician may isolate any copper wire pairs carrying the tone signal(s) injected into the copper wire pairs at the cross-box 60. Oftentimes it may be difficult to hear the tone even on a good copper pair because of background noise such as vehicle traffic in proximity to the telephone pole 64, therefore the visual indicator 27 on the probe 22 may be used to identify which copper wire pairs are carrying the tone signal(s). The technician may try several copper wire pairs at the serving terminal 62 until a suitable pair is found without returning to the cross-box 60, which may be located several miles away. Using this process and by exercising due diligence a technician is usually able to identify a suitable pair of copper wires for provisioning the new telephone service to the site 66.

This may be a more efficient process than conventional methods employing tone generators capable of testing a single copper wire pair at a time. and tends to save the technician's time. The process may be particularly efficient if the cross-box 60 and the serving terminal 62 are located several miles apart and the technician must not only climb up and down the telephone pole 64 but also must drive several miles between the location of the cross-box 60 and the serving terminal 62 on the telephone pole 64.

Although the present invention has been described with regard to certain embodiments, those of ordinary skill in the art will recognize that many modifications and variations of the present invention may be implemented. The foregoing description and the following claims are intended to cover all such modifications and variations. Furthermore, the components and processes disclosed are illustrative, but are not exhaustive. Other components and processes also may be used to make systems and methods embodying the present invention.

The invention claimed is:

1. An apparatus for connecting a tone generator to a plurality of conductors in a communication line, said apparatus comprising:
    an interconnect structure comprising:
        a first plurality of leads comprising an electrically conductive portion having a first end and a second end, wherein the first plurality of leads are commonly electrically attached at the first end and wherein the first end is configured to electrically attach to a signal output of a tone generator and the second end is configured to electrically attach to a signal conductor terminal of a cross-box; and
        a second plurality of leads comprising an electrically conductive portion having a first end and a second end, wherein the second plurality of leads are commonly electrically attached at the first end and wherein the first end is configured to electrically attach to a common return of the tone generator and the second end is configured to electrically attach to a common terminal of the cross-box.

2. The apparatus of claim 1, wherein the first end of the first plurality of leads further comprises a first pigtail conductor electrically attached to the first end of the plurality of leads.

3. The apparatus of claim 2, wherein the first pigtail conductor is configured to electrically attach to the tone generator.

4. The apparatus of claim 3, wherein the first pigtail conductor further comprises a second electrical connection device for releasably attaching the second pigtail to the tone generator.

5. The apparatus of claim 1, wherein a plurality of first electrical connection devices are spring loaded clips for releasably attaching a plurality of leads of the first plurality of leads to a plurality of electrical conductors of the communication line.

6. An apparatus for connecting a tone generator to a plurality of conductors in a communication line, said apparatus comprising:
    an interconnect structure comprising:
        a first plurality of leads comprising an electrically conductive portion having a first end and a second end, wherein the first plurality of leads are commonly electrically attached at the first end and wherein the first end is configured to electrically attach to a tone generator; and
        a plurality of first electrical connection devices electrically attached to a plurality of corresponding leads of the first plurality of leads at the second end, a plurality of first electrical connection devices configured to engage a plurality of electrical conductors of a communication line to provide an electrical connection between the tone generator and a plurality of electrical conductors of the communication line;
        a second plurality of leads comprising an electrically conductive portion having a first end and a second end, wherein the second plurality of leads are commonly electrically attached at the first end and wherein the first end is configured to electrically attach to a tone generator; and
        a plurality of third electrical connection devices electrically attached to a plurality of corresponding leads of the second plurality of leads at the second end, a plurality of third electrical connection devices configured to engage a plurality of electrical conductors of a communication line to provide an electrical connection between the tone generator and a plurality of electrical conductors of the communication line.

7. The apparatus of claim 6, wherein the first end of the second plurality of leads further comprises a second pigtail conductor electrically attached to the first end of the first plurality of leads.

8. The apparatus of claim 6, wherein the second pigtail conductor is configured to electrically attach to the tone generator.

9. The apparatus of claim 8, wherein the second pigtail conductor further comprises a fourth electrical connection device for releasably attaching the second pigtail to the tone generator.

10. The apparatus of claim 1, wherein a plurality of fourth electrical connection devices are spring loaded clips for releasably attaching a plurality of leads of the second plurality of leads to a plurality of electrical conductors of the communication line.

11. A system for testing a communication line including a plurality of electrical conductors, the system comprising:
a tone generator having a signal output terminal and a common return terminal; and
an interconnect structure electrically coupled to the tone generator, the interconnect structure comprising:
a first plurality of leads comprising an electrically conductive portion having a first end and a second end, wherein the first plurality of leads are commonly electrically attached at the first end and wherein the first end is configured to electrically attach to the signal output terminal of the tone generator and the second end is configured to electrically attach to a signal conductor terminal of a cross-box; and
a second plurality of leads comprising an electrically conductive portion having a first end and a second end, wherein the second plurality of leads are commonly electrically attached at the first end and wherein the first end is configured to electrically attach to a common return of the tone generator and the second end is configured to electrically attach to a common terminal of the cross-box;
wherein a single output tone signal emitted by the tone generator is simultaneously distributed to a plurality of electrical conductors of the communication line.

12. The system of claim 11, wherein the first end of the first plurality of leads further comprises a first pigtail conductor electrically attached at one end to the first end of the plurality of leads and at the other end to the signal output terminal of the tone generator.

13. The system of claim 12, wherein the first pigtail conductor is configured to electrically attach to the signal output terminal of the tone generator.

14. The system of claim 13, wherein the first pigtail conductor further comprises a second electrical connection device for releasably attaching the second pigtail to the signal output terminal of the tone generator.

15. The system of claim 11, wherein a plurality of first electrical connection devices are spring loaded clips for releasably attaching a plurality of leads of the first plurality of leads to a plurality of electrical conductors of the communication line.

16. A system for testing a communication line including a plurality of electrical conductors, the system comprising:
a tone generator having a signal output terminal and a common return terminal; and
an interconnect structure electrically coupled to the tone generator, the interconnect structure comprising:
a first plurality of leads comprising an electrically conductive portion having a first end and a second end, wherein the first plurality of leads are commonly electrically attached at the first end and wherein the first end is configured to electrically attach to the signal output terminal of the tone generator; and
a plurality of first electrical connection devices electrically attached to a plurality of corresponding leads of the first plurality of leads at the second end, a plurality of first electrical connection devices configured to engage a plurality of electrical conductors of a communication line to provide an electrical connection between the tone generator and a plurality of electrical conductors of the communication line;
wherein a single output tone signal emitted by the tone generator is simultaneously distributed to a plurality of electrical conductors of the communication line;
a second plurality of leads comprising an electrically conductive portion having a first end and a second end, wherein the second plurality of leads are commonly electrically attached at the first end and wherein the first end is configured to electrically attach to the common return terminal of the tone generator; and
a plurality of third electrical connection devices electrically attached to a plurality of corresponding leads of the second plurality of leads at the second end, a plurality of third electrical connection devices configured to engage a plurality of electrical conductors of a communication line to provide an electrical connection between the tone generator and a plurality of electrical conductors of the communication line.

17. The system of claim 16, wherein the first end of the second plurality of leads further comprises a second pigtail conductor electrically attached to the first end of the second plurality of leads.

18. The system of claim 16, wherein the second pigtail conductor is configured to electrically attach to the common return terminal of the tone generator.

19. The system of claim 18, wherein the second pigtail conductor further comprises a fourth electrical connection device for releasably attaching the second pigtail to the common return terminal of the tone generator.

20. The system of claim 11, wherein a plurality of fourth electrical connection devices are spring loaded clips for releasably attaching a plurality of leads of the second plurality of leads to a plurality of electrical conductors of the communication line.

* * * * *